United States Patent [19]

Maravilla et al.

[11] 4,098,613

[45] Jul. 4, 1978

[54] BASIC OIL WELL CEMENT

[75] Inventors: Sam Maravilla, Thornton Township, Cook County, Ill.; Stewart W. Tresouthick, North Township, Lake County, Ind.

[73] Assignee: United States Steel Corporation, Pittsburgh, Pa.

[21] Appl. No.: 763,444

[22] Filed: Jan. 28, 1977

[51] Int. Cl.$^2$ ................................................ C04B 7/35
[52] U.S. Cl. ........................................ 106/89; 106/90; 106/314; 106/315
[58] Field of Search ............... 106/89, 90, 109, 314, 106/315

[56] References Cited

U.S. PATENT DOCUMENTS

| | | | |
|---|---|---|---|
| 3,662,830 | 5/1972 | Martin | 106/315 |
| 3,754,953 | 8/1973 | Martin | 106/315 |
| 3,864,141 | 2/1975 | Uchikawa et al. | 106/315 |
| 3,867,163 | 2/1975 | Uchikawa et al. | 106/315 |

*Primary Examiner*—J. Poer
*Attorney, Agent, or Firm*—William L. Krayer

[57] ABSTRACT

A versatile hydraulic basic oil well cement, compatible with retarders and most common field additives and able to perform its intended function over a wide variety of downhole conditions, particularly temperature and pressure, comprises a common moderate or high sulfate resistant clinker and a weight ratio of calcium sulfate hemihydrate to insoluble anhydrite of 20:80 to 45:55. It can be made either by adding controlled amounts of gypsum and insoluble anhydrite to the grinding circuit or by blending ground hemihydrate and insoluble anhydrite to ground clinker.

10 Claims, 3 Drawing Figures

BASIC OIL WELL CEMENT

BACKGROUND OF THE INVENTION

Basic oil well cement is intended for use as a basic cement in oil wells from surface to 8,000 ft (2440 m) depth as manufactured or it can be used with accelerators and retarders to cover a wide range of well depths and temperatures. The American Petroleum Institute has defined basic oil well cement as a product obtained by grinding clinker (typically ASTM Type II) of moderate or high sulfate resistance consisting essentially of hydraulic calcium silicates to which no additions other than calcium sulfate or water or both are interground or blended with the clinker during manufacture.

Basic oil well cement is used in combination with water and, usually, retarder and/or other additives in various combinations to form a slurry which is pumped into the well. The slurry is directed to various areas or horizons in the well to perform specific functions such as cementing the oil well casing in the hole, strengthening and making impermeable certain incompetent strata, blocking oil, gas, or water flows or the like. The slurry is designed to perform a specific function at a specific set of temperature and pressure conditions, and the performance characteristics of the slurry are modified by the use of additives. In order for the slurry to work properly, the retarder and/or other additives and the cement must be compatible so that the slurry will not thicken unduly before it reaches the correct area of the well and so the slurry sets to a hard cementitious material at the proper time.

It is difficult to produce a basic oil well cement that is compatible with retarder under the wide range of field conditions even though a basic oil well cement may satisfy the API chemical and physical requirements. Basic hydraulic oil well cements can be unpredictable in their behavior with retarder or combinations of additives and the slurry performance can be badly impaired, thus causing problems or failures in cementing operations.

It has been known that the state of calcium sulfate in ordinary construction-type portland cement controls to a large extent the performance of those cements. It is known that the calcium sulfate can appear in portland cement in four or more forms, such as gypsum ($CaSO_4 \cdot 2H_2O$), hemihydrate ($CaSO_4 \cdot \frac{1}{2}H_2O$), insoluble anhydrite ($CaSO_4$) and soluble anhydrite ($CaSO_4$). Calcium sulfate is generally added to cement as gypsum and/or natural anhydrite (insoluble $CaSO_4$) as a set control agent.

The heat generated in the grinding process converts some or all of the gypsum to hemihydrate and perhaps converts some of the gypsum to soluble anhydrite. In ordinary construction cements, an overabundance of hemihydrate or soluble anhydrite will cause "false set" due to the re-hydration of these materials when water is added to the cement which reduces plasticity of concrete, requires extra water, and generally reduces performance. Too little hemihydrate may cause "flash setting" which renders the concrete virtually useless. It is known that insoluble anhydrite can be substituted for part of the gypsum in ordinary construction cements to control "false set", because insoluble anhydrite is already dehydrated and is a stable calcium sulfate not readily re-hydratable as is hemihydrate or soluble anhydrite. It is further known that insoluble anhydrite can completely replace gypsum to control the set of ordinary construction cement but has certain disadvantages.

In the case of basic oil well cements, however, thickening time as defined by API, not false set, or flash set, is the criterion which is used for the most part to judge and characterize acceptable performance. Furthermore, the slurry consistency, defined as "units of consistency" ($U_c$) by API at various ages of the slurry under given conditions of temperature and pressure, is a critical criterion of performance. These slurry characteristics can be varied by the addition of retarders and certain additives in the correct amounts.

SUMMARY OF THE INVENTION

We have discovered that the amount and state of the added calcium sulfate in hydraulic basic oil well cement is critical to the good performance of the cement with retarders and other additives.

We have discovered that in oil well cement, especially oil well cements to be used in combination with organic and inorganic additives, there is a specific range of ratios of hemihydrate to gypsum that can be tolerated and that there is an optimum ratio of hemihydrate to gypsum for best retarder and/or other additive response, smooth thickening time performance, and strength.

We have further discovered that because of changes in milling temperature, milling retention time, cement cooler discharge temperature, and differences in cement storage time, variable amounts of hemihydrate are produced from the added gypsum or added gypsum/insoluble anhydrite blend. We further have discovered that hydraulic basic oil well cement performs well when the hemihydrate to gypsum ratio is within a certain range, but when too much of the gypsum in the cement remains as gypsum, or too much is converted to hemihydrate, the cement performs badly. Since most cement milling systems and storage systems do not permit uniform production of hemihydrate, the ratio of hemihydrate to gypsum varies considerably.

Since the gypsum, hemihydrate, and anhydrites have different solubility rates, and, since in all oil well cement slurry systems with field retarders and/or other additives, the retarding effects of the calcium sulfates must be present at different stages of the hydration history of the slurry system, the different forms of calcium sulfate and their relative amounts will affect the thickening time and consistency of the slurry.

In order to overcome the aforementioned problems in the production of a uniform, smoothly performing hydraulic oil well cement, we have invented a new cement and a method of manufacturing it. Because we have found that certain amounts of hemihydrate as a percentage of gypsum and of insoluble anhydrite cause poor performance of oil well cement, our invention uses only stable forms of calcium sulfate in the cement. In our invention, the calcium sulfate is employed as hemihydrate and insoluble anhydrite, both stable within the temperatures normally found in cement grinding and cement storage. By insoluble anhydrite, we mean natural anhydrite, or anhydrous calcium sulfate ($CaSO_4$). We have further discovered that the ratio of hemihydrate to insoluble anhydrite is critical in that there is an optimum range of ratios for best performance beyond which range, the performance of the cement falls off rapidly. Thus, when the cement contains the proper ratio of hemihydrate to insoluble anhydrite and very little or no gypsum (we tolerate a calcium sulfate dihydrate maximum equivalent to 1.1% $SO_3$ by weight of cement), the cement performance will be predictable and good, assuming proper clinker chemistry, and the cement will not suffer from further change due to storage at elevated temperatures as would happen if the cement contained gypsum.

Thus, our invention includes a hydraulic cement useful in oil well cementing comprising (a) cement clinker of a composition comprising from 45 to 68% tricalcium silicate ($C_3S$) and from 0 to 8% tricalcium aluminate ($C_3A$), and (b) from about 2.0 to about 4.0% sulfur trioxide ($SO_3$) by weight of cement, said sulfur trioxide present in calcium sulfate hemihydrate and insoluble calcium sulfate anhydrite in a ratio of from about 20:80 to 45:55.

As is known in the art, cement clinker includes major amounts of $C_2S$ and $C_4AF$, but the particular amounts are unimportant in our invention.

Our invention is compatible with commercially available retarders, fluid-loss additives, and the like. For example, lignosulfonic acid salts (U.S. Pat. No. 3,053,673), ferrochrome lignosulfonate (U.S. Pat. No. 3,375,873), carboxy methyl cellulose (U.S. Pat. Nos. 2,995,189 and Re. 23,873), carboxymethylhydroxyethyl cellulose (U.S. Pat. Nos. 3,245,814 and 2,985,239) and combinations of CMHEC with diatomaceous earth (U.S. Pat. No. 3,219,112), formaldehyde (U.S. Pat. No. 3,197,316) etc., sulfonated polystyrene, sulfonated vinylpolytoluene and glucoheptonic acid (U.S. Pat. No. 3,234,154), dithiocarbonates or xanthates (U.S. Pat. No. 3,104,704), carboxymethyl dextrans (U.S. Pat. No. 2,902,378), hydroxy-alkyl cellulose ethers (U.S. Pat. No. 3,483,007), combinations of bentonite and accroides gum (U.S. Pat. No. 2,945,539), and gilsonite (U.S. Pat. No. 3,036,633) may be used with our invention.

As is known in the art, there are several different forms of calcium sulfate:

1. Gypsum, or calcium sulfate dihydrate.

2. α-hemihydrate, the more stable hemihydrate, prepared by heating at 239° F in an atmosphere of saturated steam. There is good evidence that α-hemihydrate can contain slightly more or less than the theoretical water content. Autoclave plaster is essentially α-hemihydrate.

3. β-hemihydrate, obtained when the dihydrate is partially dehydrated under conditions where a nearly saturated steam atmosphere does not prevail. Stucco plaster is essentially β-hemihydrate. Kettle plasters contain a considerable amount of the β variety, which has markedly different properties from α-hemihydrate.

4. α-soluble anhydrite, prepared by heating α-hemihydrate. It may be obtained virtually water-free.

5. β-soluble anhydrite, prepared by heating the β-hemihydrate, or by direct heating of gypsum. It always contains some water, usually around 0.2 percent. Most "soluble anhydrite" is essentially the β variety. It rehydrates readily.

6. Insoluble anhydrite is prepared by heating either soluble anhydrite or any hydrate to 650° F for 1 hour. The conversion can be made at lower temperatures at slower rates. The optical and thermal properties of natural anhydrite are identical with those of artificially-prepared insoluble anhydrite.

See Kelley, Southard, nd Anderson, "Thermodynamic Properties of Gypsum and Its Dehydration Products", U.S. Bureau of Mines Technical paper 625, 70 pp. When we use the term "hemihydrate", we mean either or both the alpha and beta form made in any manner; when we use the term "insoluble anhydrite", we mean the form described above, made in any manner.

We practice two methods within our invention to achieve the same end results. The first, and preferred, is to feed into a cement grinding mill a combination of gypsum and insoluble anhydrite, along with the cement clinker, so that all three are in a desired proportion to each other, especially the ratio of gypsum and insoluble anhydrite. The milling circuit is operated in such a manner as to raise the temperature of the materials being ground and to provide a retention time for same so that the gypsum will be essentially uniformly dehydrated to the hemihydrate state in the resulting ground product. Since different milling circuits provide different retention times, different energy transfer constants, and different vapor pressures in respect to the vapor pressure of the gypsum water of crystallization, we cannot be bound to a specific mill discharge temperature, but such a temperature would typically be about 250° F to 300° F. However, we may use temperatures from about 200° F to 750° F. The resultant cement contains calcium sulfate as hemihydrate and insoluble anhydrite in proper ratio. The insoluble anhydrite would be unchanged by the milling process since it is already essentially anhydrous.

The second method which we practice consists of grinding the clinker by itself and blending into the ground clinker a mixture of ground hemihydrate and insoluble anhydrite, or any combination of grinding and addition such as intergrinding clinker and insoluble anhydrite and post-blending hemihydrate or intergrinding clinker and gypsum and post-blending insoluble anhydrite.

In particular, our invention concerns the intergrinding or interblending of a portland cement clinker and calcium sulfate as hemihydrate and insoluble anhydrite to produce a cement which has the composition and fineness ranges shown in Table I.

TABLE I

| | |
|---|---|
| MgO | 6.0% max. |
| $SO_3$ | 2.0 to 4.0% |
| Loss on Ignition | 3.5% max. |
| Insoluble Residue | 1.0% max. |
| $Na_2O$ Equivalent | 1.0% max. |
| $C_3S$ | 45.0% min. |
| | 68.0% max. |
| $C_3A$ | 8.0% max. |
| Wagner Specific Surface 1100 – 1800 $cm^2/g$ | |

Furthermore, we have found that good performance for hydraulic basic oil well cement slurry with a common calcium lignosulfonate retarder is achieved when the hemihydrate to insoluble anhydrite ratio is in the range of 20/80 to 45/55 and the cement $SO_3$ content is in the range of 2.0 to 4.0%. To extend the thickening time of hydraulic basic oil well cement in the range of about 100° to 200° F, a calcium lignosulfonate retarder is typically used. This is illustrated by thickening time Curves A, B and C and consistency Curve D in FIG. 1 developed from experimental data, also presented in Table II, III and IV. To extend the thickening time of hydraulic basic oil well cement in the range of 200° F and higher, a 1:1 blend by weight of a commercial calcium lignosulfonate retarder and borax (sodium tetraborate — $Na_2B_4O_7.10H_2O$) may be used, as is known and practiced in the art. This is illustrated by thickening time Curve E in FIG. 2 developed from experimental data, and in Table V.

Figure 1:
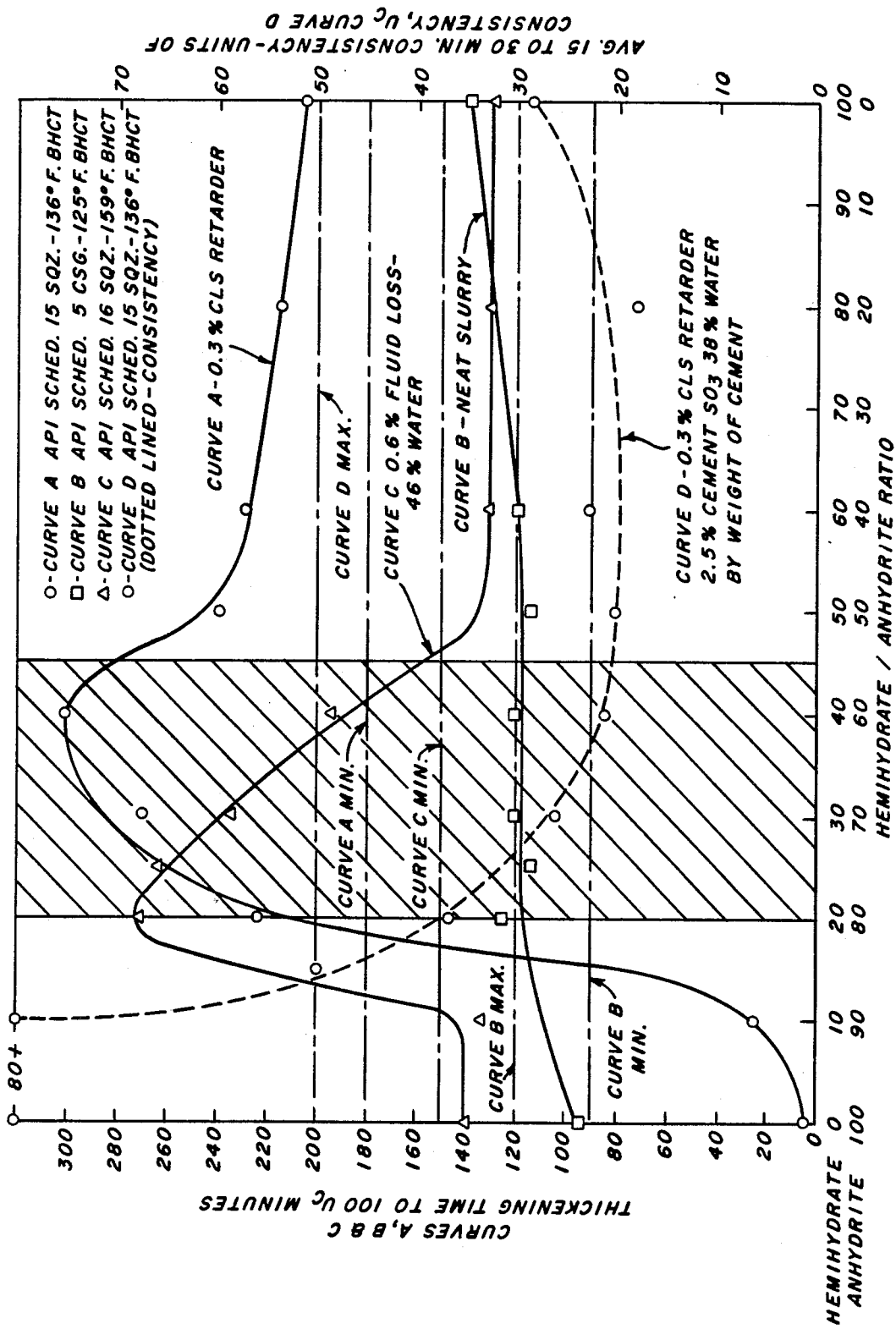
FIG. 1 presents the results of various American Petroleum Institute tests of our 20/80 to 45/55 cements using calcium lignosulfonate retarder.

Although we have used certain retarders and additives in this description and our examples, we do not intend to be limited to them. Our invention is compatible with essentially all commercial retarders, such as CMC, CMHEC, water soluble borates, salts of gluconic acid, etc.

The following examples are presented in further illustration of our invention, and should not be regarded as limiting the invention in any way. Field additives and mix water are expressed as percent by weight of cement (clinker + calcium sulfates). The tests carried out are those prescribed in the latest edition of and supplement to API RP 10B "Recommended Practice for Testing Oil Well Cements and Cement Additives". The term BHCT means bottom-hole circulating temperature. The fineness of the cement as compounded with calcium sulfates is in the range of 1300–1350 cm$^2$/g Wagner specific surface, (ASTM C115: Fineness of Portland Cement by the Turbidimeter), although our invention is not limited to this range of fineness; we prefer to use any fineness between about 1100 and 1800 cm$^2$/g. Fineness above or below this range is operable to a lesser degree and may be impractical under certain conditions.

When we use the term "ratio of hemihydrate to anhydrite" or similar terms, we mean the ratio of calcium sulfate hemihydrate to calcium sulfate anhydrite expressed in the ratio of weight percents of SO$_3$ in each form. It should be understood that the terms gypsum, hemihydrate, and anhydrite include natural, impure, and manufactured forms.

EXAMPLE 1

An API Class H basic oil well cement whose chemical and physical requirements are defined by the latest edition of and supplement to API Spec 10A, "Specification for Oil Well Cements and Cement Additives" was manufactured using different forms of calcium sulfate such as gypsum, insoluble anhydrite and combinations thereof.

Clinker and sulfate compositions were post-blended in accordance with the present invention using varying amounts of hemihydrate and insoluble anhydrite blends. By post-blending we mean blending components into the clinker after the clinker has been ground. CLS (calcium lignosulfonate) field retarder in a quantity (0.3% based on the weight of cement) considered optimum for a bottom-hole circulating temperature of 136° F, and water were added to the cement formulations to produce slurries having a density of 16.5 lb/gal (38% water by weight of cement) suitable for oil well cementing practice. The thickening times were measured, as were the consistencies, using an API #15 Squeeze-cementing schedule of 6000 ft (BHCT — 136° F). In another series of tests, the API #5 casing cement specification test schedule of 8000 ft (125° F BHCT) was measured, as were the consistencies, using varying amounts of hemihydrate and insoluble anhydrite blend ratios. Water was added to the neat slurry in accordance with Class H specifications, i.e., 38% by weight of cement. The results obtained in these tests are set forth in Tables II and III and depicted as Curves A, B and C in FIG. 1.

TABLE II

LOW TEMPERATURE THICKENING TIME DATA FOR LABORATORY PREPARED BASIC OIL WELL CEMENT POST-BLENDED WITH HEMIHYDRATE AND ANHYDRITE

Basic Oil Well Cement + 0.3% CLS[1] Retarder with 38% Water by weight of cement. API Schedule 15 Squeeze, 136° F BHCT

| Cement SO$_3$ % | Consistency - U$_c$ minutes | | | | | | Thickening Time minutes to | | |
|---|---|---|---|---|---|---|---|---|---|
| | 0 | 15 | 30 | 45 | 60 | 120 | 50 U$_c$ | 70 U$_c$ | 100 U$_c$ |
| *0 Hemihydrate/100 Anhydrite[3] Ratio* | | | | | | | | | |
| 2.0 | 17 | | | | | | 1 | 1 | 1 |
| 2.5 | 6 | | | | | | 4 | 4 | 5 |
| 3.0 | 8 | | | | | | 5 | 6 | 8 |
| 3.5 | 8 | | | | | | 1 | 2 | 2 |
| 4.0 | 7 | | | | | | 2 | 3 | 4 |
| 4.5 | 8 | | | | | | 2 | 3 | 3 |
| *10 Hemihydrate/90 Anhydrite Ratio* | | | | | | | | | |
| 2.0 | 12 | 51 | 51 | 52 | 52 | 60 | 10 | 131 | 141 |
| 2.5 | 9 | 44 | | | | | 25 | 25 | 25 |
| 2.75 | 11 | | | | | | 6 | 6 | 6 |
| 3.0 | 9 | | | | | | 10 | 10 | 10 |
| 3.5 | | Test not run. | | | | | | | |
| 4.0 | | Test not run. | | | | | | | |
| 4.5 | | Test not run. | | | | | | | |
| *20 Hemihydrate/80 Anhydrite Ratio* | | | | | | | | | |
| 1.75 | 8 | 37 | 38 | 40 | 41 | | 131 | 144 | 153 |
| 2.0 | 15 | 51 | 51 | 53 | 55 | 60 | 9 | 167 | 182 |
| 2.25 | 5 | 34 | 34 | 34 | 34 | 46 | 187 | 197 | 204 |
| 2.50 | 10 | 36 | 37 | 37 | 38 | 41 | 204 | 214 | 224 |
| 2.75 | 13 | 27 | 30 | 30 | 31 | 36 | 231 | 237 | 245 |
| 3.0 | 23 | 27 | 27 | 28 | 28 | 28 | 253 | 262 | 267 |
| 3.5 | 5 | 16 | 13 | 13 | 13 | 14 | 195 | 204 | 215 |
| 4.0 | 7 | 20 | 20 | 20 | 20 | 21 | 178 | 185 | 192 |
| 4.5 | 2 | 8 | 7 | 7 | 6 | 6 | 192 | 196 | 201 |
| *30 Hemihydrate/70 Anhydrite Ratio* | | | | | | | | | |
| 1.75 | 12 | 26 | 29 | 30 | 33 | 35 | 163 | 171 | 178 |
| 2.0 | 12 | 34 | 34 | 34 | 34 | 34 | 222 | 231 | 238 |
| 2.25 | 20 | 20 | 21 | 21 | 20 | 20 | 233 | 239 | 246 |
| 2.50 | 9 | 26 | 26 | 26 | 27 | 31 | 256 | 263 | 270 |
| 2.75 | 18 | 24 | 24 | 24 | 24 | 25 | 282 | 290 | 295 |
| 3.0 | 9 | 15 | 15 | 15 | 17 | 18 | 281 | 281 | 305 |
| 3.5 | 3 | 13 | 13 | 13 | 13 | 13 | 184 | 191 | 199 |
| 4.0 | 8 | 19 | 18 | 19 | 19 | 21 | 173 | 180 | 188 |
| 4.5 | 1 | 1 | 1 | 1 | 1 | 1 | 169 | 174 | 179 |
| *40 Hemihydrate/60 Anhydrite Ratio* | | | | | | | | | |
| 1.75 | 5 | 9 | 11 | 11 | 11 | 11 | 210 | 215 | 221 |
| 2.0 | 13 | 25 | 26 | 27 | 27 | 31 | 262 | 270 | 280 |
| 2.25 | 20 | 23 | 23 | 22 | 22 | 22 | 292 | 299 | 304 |
| 2.5 | 19 | 21 | 21 | 21 | 21 | 25 | 287 | 294 | 301 |
| 2.75 | 9 | 17 | 16 | 16 | 14 | 17 | 280 | 287 | 296 |
| 3.0 | 10 | 20 | 20 | 20 | 20 | 21 | 207 | 215 | 221 |
| 3.5 | 4 | 16 | 16 | 16 | 16 | 16 | 168 | 176 | 183 |
| 4.0 | 5 | 17 | 15 | 16 | 16 | 18 | 172 | 181 | 188 |
| 4.5 | 2 | 8 | 9 | 9 | 9 | 10 | 158 | 167 | 174 |
| *50 Hemihydrate/50 Anhydrite Ratio* | | | | | | | | | |
| 2.0 | 23 | 18 | 19 | 24 | 49 | | 63 | 74 | 86 |
| 2.5 | 13 | 20 | 20 | 21 | 29 | 29 | 226 | 232 | 238 |
| 3.0 | 38 | 33 | 35 | 35 | 57 | | 57 | 65 | 79 |
| 3.5 | 8 | 19 | 17 | 17 | 17 | 20 | 156 | 163 | 172 |
| 4.0 | 3 | 17 | 17 | 18 | 18 | 20 | 153 | 160 | 169 |
| 4.5 | 1 | 8 | 8 | 7 | 7 | 7 | 162 | 166 | 170 |
| *60 Hemihydrate/40 Anhydrite Ratio* | | | | | | | | | |
| 2.0 | 26 | 23 | 30 | 40 | 72 | | 51 | 59 | 70 |
| 2.5 | 9 | 23 | 23 | 23 | 25 | 26 | 219 | 223 | 228 |
| 3.0 | 10 | 25 | 29 | 29 | 32 | 48 | 123 | 131 | 135 |
| 3.5 | 11 | 19 | 19 | 19 | 20 | 47 | 126 | 132 | 138 |
| 4.0 | 11 | 22 | 22 | 23 | 55 | | 119 | 123 | 128 |
| 4.5 | 8 | 8 | 8 | 8 | 8 | 62 | 118 | 122 | 126 |
| *80 Hemihydrate/20 Anhydrite Ratio* | | | | | | | | | |
| 2.0 | 8 | 27 | 28 | 28 | 28 | 88 | 112 | 118 | 123 |
| 2.5 | 8 | 18 | 18 | 18 | 18 | 18 | 205 | 210 | 215 |
| 3.0 | 11 | 21 | 22 | 27 | 27 | | 105 | 108 | 115 |
| 3.5 | 15 | 25 | 25 | 27 | 27 | 85 | 111 | 117 | 122 |
| 4.0 | 13 | 21 | 24 | 25 | 26 | | 107 | 114 | 119 |
| 4.5 | 6 | 14 | 15 | 15 | 18 | | 109 | 112 | 116 |
| *100 Hemihydrate/0 Anhydrite Ratio* | | | | | | | | | |
| 1.75 | 13 | 19 | 18 | 18 | 18 | 35 | 128 | 134 | 139 |
| 2.0 | 7 | 24 | 24 | 26 | 27 | 30 | 214 | 220 | 224 |
| 2.5 | 13 | 27 | 28 | 30 | 30 | 30 | 193 | 200 | 205 |
| 3.0 | 14 | 21 | 21 | 21 | 21 | 26 | 185 | 191 | 195 |

TABLE II-continued

LOW TEMPERATURE THICKENING TIME DATA
FOR LABORATORY PREPARED BASIC OIL
WELL CEMENT POST-BLENDED
WITH HEMIHYDRATE AND ANHYDRITE

Basic Oil Well Cement + 0.3% CLS[1] Retarder with
38% Water by weight of cement.
API Schedule 15 Squeeze, 136° F BHCT

| Cement SO$_3$ % | Pressurized Consistometer[2] Consistency - U$_c$ minutes | | | | | | Thickening Time minutes to | | |
|---|---|---|---|---|---|---|---|---|---|
| | 0 | 15 | 30 | 45 | 60 | 120 | 50 U$_c$ | 70 U$_c$ | 100 U$_c$ |
| 3.5 | 12 | 24 | 24 | 27 | 31 | | 99 | 105 | 110 |
| 4.0 | 13 | 22 | 27 | 28 | 32 | | 106 | 112 | 116 |
| 4.5 | 6 | 11 | 14 | 15 | 22 | | 94 | 98 | 102 |

[1]CLS - calcium lignosulfonate retarder by weight of cement.
[2]As described in API RP 10B.
[3]Insoluble anhydrite.

TABLE III

API SPECIFICATION THICKENING TIME
DATA FOR LABORATORY PREPARED
BASIC OIL WELL CEMENT POST-BLENDED
WITH HEMIHYDRATE AND ANHYDRITE[1]

Neat Basic Oil Well Cement with 38% Water[2]
API Schedule 5 Casting Cement
Specification Test - 125° F BHCT

| SO$_3$ Blend Ratio Hemihydrate/Anhydrite[1] | Pressurized Consistometer Consistency - U$_c$ minutes | | | | | | Thickening Time minutes to | | |
|---|---|---|---|---|---|---|---|---|---|
| | 0 | 15 | 30 | 45 | 60 | 120 | 50 U$_c$ | 70 U$_c$ | 100 U$_c$ |
| 2.5% Cement SO$_3$ | | | | | | | | | |
| 0/100 | 15 | 24 | 24 | 28 | 32 | | 80 | 89 | 96 |
| 20/80 | 8 | 10 | 10 | 11 | 11 | 81 | 104 | 115 | 127 |
| 25/75 | 18 | 18 | 16 | 16 | 18 | | 91 | 102 | 116 |
| 30/70 | 10 | 12 | 12 | 12 | 14 | 100 | 97 | 109 | 120 |
| 40/60 | 11 | 12 | 12 | 14 | 14 | 97 | 94 | 107 | 120 |
| 50/50 | 10 | 11 | 13 | 15 | 20 | | 94 | 105 | 116 |
| 60/40 | 10 | 11 | 12 | 14 | 16 | 100 | 99 | 109 | 120 |
| 80/20 | 13 | 14 | 14 | 14 | 14 | 73 | 108 | 119 | 129 |
| 100/ 0 | 15 | 15 | 17 | 19 | 23 | 70 | 99 | 120 | 140 |

[1]Insoluble calcium sulfate anhydrite.
[2]By weight of cement.

It will be noted from Table II and Curves A and D, FIG. 1, that both SO$_3$ content (which is, for this cement, about 2.5%), and the ratio of hemihydrate to insoluble anhydrite significantly effect performance of the basic oil well cement with CLS retarder. Tthe hemihydrate/insoluble anhydrite blend ratio can be between about 20/80 and 45/55 (FIG. 1) but the hemihydrate/insoluble anhydrite ratio preferred is between 25/75 to 40/60.

Consistency values which are higher than about 50 U$_c$ in the 15-30 minute stirring period are considered unacceptable.

EXAMPLE 2

Basic cement formulations were prepared by our post-blending method using an optimum SO$_3$ content of 2.5% and ratios of hemihydrate to insoluble anhydrite in the range of 20/80 to 45/55. Two different types of common field additives were used, namely, calcium lignosulfonate retarder (CLS) and a fluid loss additive which is a blend of cellulose and sodium salt of an alkyl aryl sulfonate. The desirable quantity of CLS retarder as determined by assumed field conditions was 0.3% by weight of cement. Water (40% by weight of cement) was added to the basic cement formulations to produce slurries with densities suitable for oil well cementing practice. Another series of tests was conducted using 0.6% fluid loss additive (FL) and 46% water by weight of cement. In both series of field additive tests, thickening times and consistencies were measured, using an API squeeze-cementing schedule (16) of 8000 ft (159° F BHCT). The results which were obtained in these tests are set forth in Table IV. Curve C, FIG. 1, depicts thickening times obtained for the series of tests with the fluid loss additive. It may be noted that the thickening time of the basic cement formulations using the ratio of hemihydrate to insoluble anhydrite in the preferred range of 25/75 to 40/60 are satisfactorily above the recommended field thickening time of at least 150 minutes.

TABLE IV

FIELD ADDITIVE THICKENING TIME DATA FOR LABORATORY
PREPARED BASIC OIL WELL CEMENT POST-BLENDED
WITH HEMIHYDRATE AND ANHYDRITE[1]

2.5% Cement SO$_3$
Pressurized consistometer

| SO$_3$ Blend Ratio Hemi/Anhyd | Field Additive[2] % | Water[2] % | Consistency - U$_c$ minutes | | | | | | Thickening Time minutes to | | |
|---|---|---|---|---|---|---|---|---|---|---|---|
| | | | 0 | 15 | 30 | 45 | 60 | 120 | 50 U$_c$ | 70 U$_c$ | 100 U$_c$ |
| API Schedule 16 Squeeze - 159° F BHCT | | | | | | | | | | | |
| 20/80 | 0.3 CLS[3] | 40 | 2 | 27 | 36 | 38 | 40 | 45 | 245 | 255 | 260 |
| 25/75 | | | 3 | 21 | 29 | 32 | 34 | 43 | 271 | 278 | 285 |
| 30/70 | | | 13 | 20 | 30 | 30 | 32 | 45 | 210 | 292 | 300 |
| 40/60 | | | 4 | 14 | 17 | 20 | 23 | 27 | 328 | 333 | 338 |
| 50/50 | | | 9 | 18 | 21 | 25 | 25 | 30 | 232 | 238 | 245 |
| 20/80 | 0.3 CLS | 46 | 8 | 14 | 17 | 19 | 21 | 23 | 311 | 318 | 325 |
| 25/75 | | | 1 | 8 | 10 | 10 | 12 | 15 | 353 | 358 | 370 |
| 30/70 | | | 1 | 1 | 1 | 3 | 2 | 5 | 315+ | | |
| 40/60 | | | 2 | 7 | 8 | 9 | 9 | 9 | 382 | 388 | 394 |
| 50/50 | | | 1 | 7 | 7 | 8 | 9 | 10 | 254 | 259 | 268 |
| 0/100 | 0.6 FL[4] | 46 | 6 | 7 | 7 | 7 | 7 | 21 | 129 | 133 | 139 |
| 10/90 | | | 6 | 7 | 7 | 7 | 7 | 43 | 123 | 127 | 131 |
| 20/80 | | | 6 | 6 | 6 | 6 | 6 | 6 | 262 | 266 | 271 |
| 25/75 | | | 6 | 6 | 6 | 4 | 4 | 4 | 258 | 262 | 265 |

TABLE IV-continued
FIELD ADDITIVE THICKENING TIME DATA FOR LABORATORY PREPARED BASIC OIL WELL CEMENT POST-BLENDED WITH HEMIHYDRATE AND ANHYDRITE[1]

| SO$_3$ Blend Ratio Hemi/Anhyd | Field Additive[2] % | Water[2] % | Consistency - U$_c$ minutes (2.5% Cement SO$_3$ Pressurized consistometer) | | | | | | Thickening Time minutes to | | |
|---|---|---|---|---|---|---|---|---|---|---|---|
| | | | 0 | 15 | 30 | 45 | 60 | 120 | 50 U$_c$ | 70 U$_c$ | 100 U$_c$ |
| 30/70 | | | 4 | 3 | 1 | 1 | 1 | 1 | 227 | 229 | 235 |
| 40/60 | | | 2 | 3 | 3 | 4 | 3 | 2 | 191 | 193 | 195 |
| 50/50 | | | 9 | 15 | 14 | 14 | 14 | 100 | 114 | 117 | 120 |
| 60/40 | | | 8 | 10 | 10 | 10 | 10 | 65 | 110 | 121 | 132 |
| 80/20 | | | 7 | 13 | 13 | 13 | 13 | 78 | 110 | 117 | 129 |
| 100/0 | | | 11 | 12 | 12 | 12 | 14 | 80 | 102 | 113 | 132 |

FOOTNOTES:
[1]Insoluble anhydrite.
[2]By weight of cement.
[3]CLS - calcium lignosulfonate retarder.
[4]FL - retarder-fluid loss additive (Blend of cellulose and sodium salt of alkyl aryl sulfonate).

Figure 2:
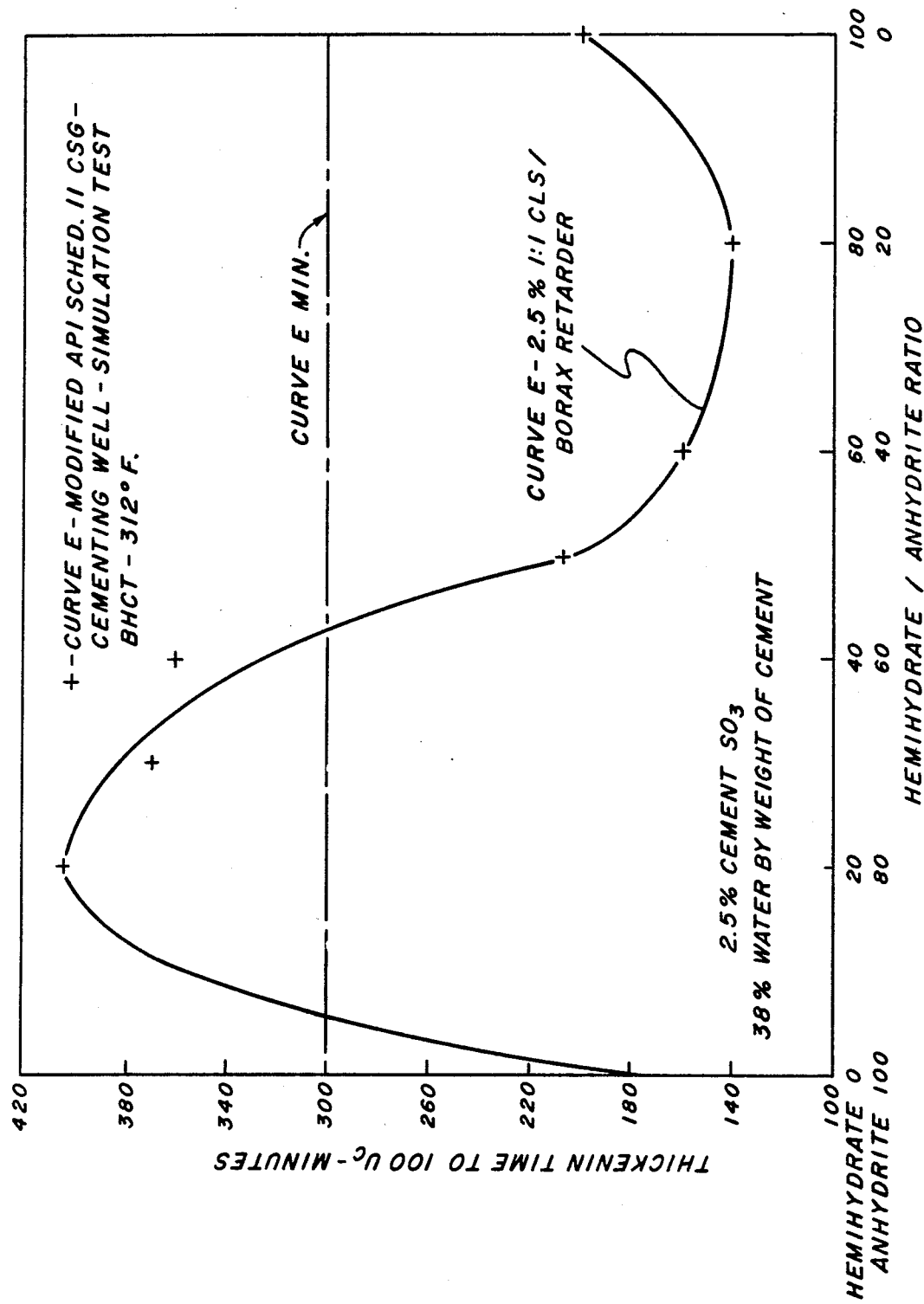
FIGS. 2 and 3 present results for different simulated well depths, using a combination CLS/borax retarder.
Figure 3:
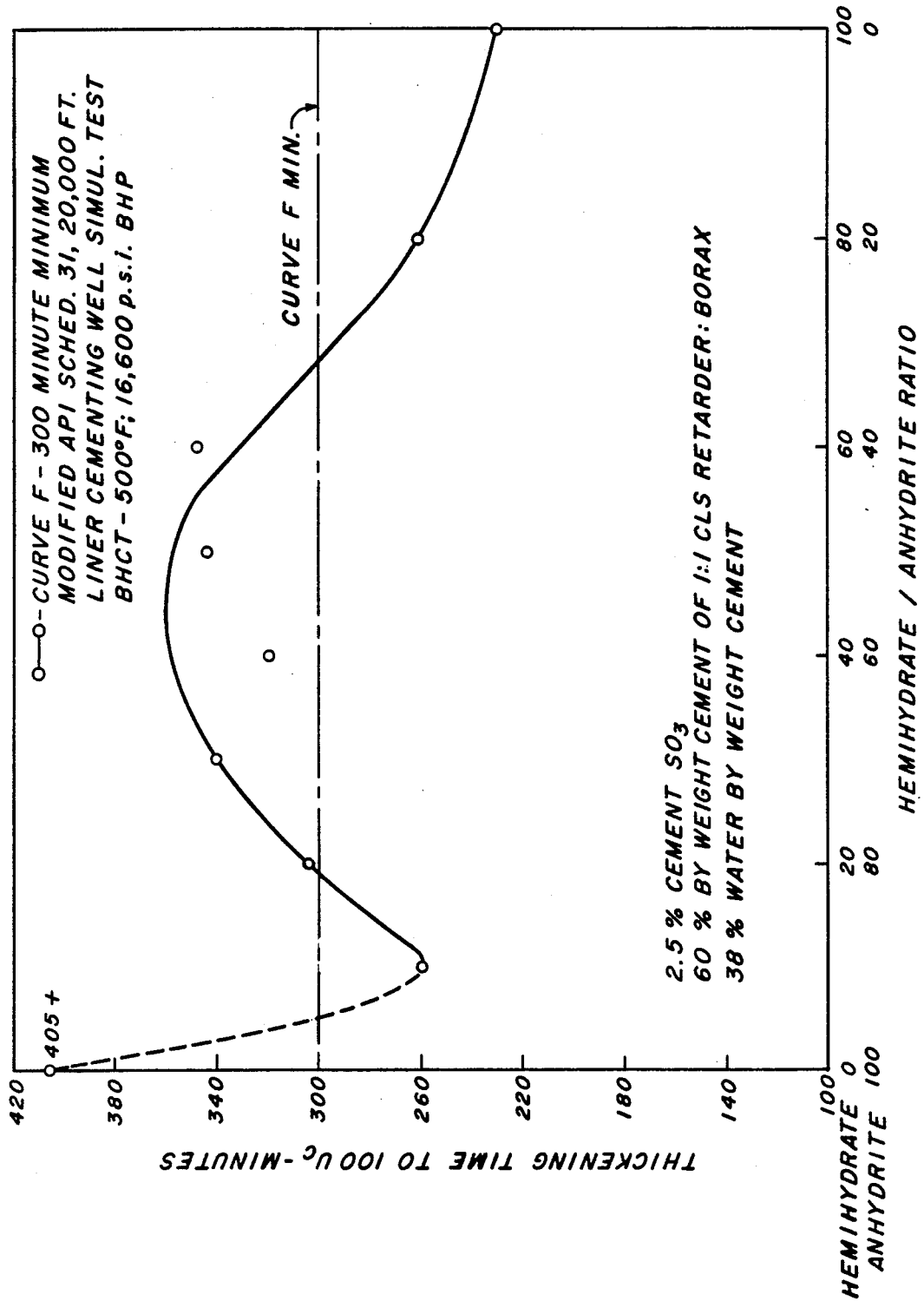

EXAMPLE 3 basic cement formulations were prepared as in Example 1 by post-blending clinker and sulfate compositions using varying amounts of hemihydrate and insoluble anhydrite blends. A typical high temperature retarder blend comprising a 1:1 blend by weight of calcium lignosulfonate field retarder and borax in a quantity (2.5% by weight of cement) judged to be optimum for a bottom-hole circulating temperature of 312° F, and 38% water by weight of cement were added to the cement formulations to produce slurries having a density of 16.5 lb/gal suitable for high-temperature oil well cementing. The thickening times and consistencies are measured using a modified API casing cementing schedule (11) of 20,000 ft (BHCT — 321° F; bottom-hole pressure — 164000 psi; 1.3° F/100 ft temperature gradient; 3.09° F/min heating rate). The results obtained in these tests are set forth in Table V and depicted as Curve E in FIG. 2. It may be noted that the thickening time of the basic cement formulations using the ratio of hemihydrate to insoluble anhydrite in the range of 20/80 to 45/55 are satisfactorily above the minimum recommended field thickening time of at least 300 minutes and desired consistencies below 10 U$_c$ in the first 60 minutes of test stirring period. Further, it should be noted that the ratios of hemihydrate to insoluble anhydrite of 20/80 and 45/55 applicable to high temperature formulations in this example are equally applicable to formulations at low temperature such as appear in Examples 1, 2 and 4.

TABLE V
HIGH TEMPERATURE THICKENING TIME DATA FOR LABORATORY PREPARED BASIC OIL WELL CEMENT POST-BLENDED WITH HEMIHYDRATE AND ANHYDRITE
Modified API Schedule 11, 20000 ft Casing-Cementing Well Simulation Test[1]

| SO$_3$ Blend Ratio Hemihydrate/Anhydrite | 1:1 CLS/Borax[2] % | Consistency - U$_c$ minutes (Pressurized Consistometer) | | | | | | Thickening Time minutes | | |
|---|---|---|---|---|---|---|---|---|---|---|
| | | 0 | 15 | 30 | 45 | 60 | 120 | 50 U$_c$ | 70 U$_c$ | 100 U$_c$ |
| | | 2.5% Cement SO$_3$ | | | | | | | | |
| 0/100 | 2.5 | 3 | 3 | 3 | 2 | 2 | 1 | 175 | 175 | 175 |
| 20/80 | 2.5 | 6 | 4 | 3 | 4 | 4 | 4 | 401 | 403 | 404 |
| 30/70 | 0.5 | 8 | 100 | | | | | 15 | 15 | 15 |
| 30/70 | 1.0 | 5 | 12 | 17 | 24 | 66 | | 57 | 60 | 61 |
| 30/70 | 1.5 | 8 | 7 | 24 | 69 | | | 41 | 46 | 55 |
| 30/ 70 | 2.0 | 2 | 3 | 2 | 2 | 2 | 92 | 116 | 118 | 121 |
| 30/70 | 2.25 | 2 | 2 | 2 | 2 | 2 | 1 | 281 | 286 | 287 |
| 30/70 | 2.5[3] | 2 | 1 | 1 | 1 | 2 | 1 | 366 | 367 | 368 |
| 40/60 | 2.5 | 2 | 2 | 2 | 2 | 2 | 1 | 357 | 357 | 358 |
| 50/50 | 2.5 | 3 | 2 | 2 | 2 | 2 | 2 | 205 | 206 | 207 |
| 60/40 | 2.5 | 1 | 1 | 1 | 1 | 1 | 4 | 157 | 158 | 159 |
| 80/20 | 2.5 | 5 | 4 | 4 | 4 | 3 | 10 | 137 | 140 | 142 |
| 100/ 0 | 2.5 | 1 | 2 | 2 | 2 | 2 | 2 | 196 | 198 | 199 |

[1]Test Conditions:
38% Water by weight of cement
Bottom-hole circulating temperature 312° F
Bottom-hole pressure 16400 psi
Temperature Gradient 1.3° F/100 ft
Heating Rate 3.09° F/min
[2]1:1 CLS (calcium lignosulfonate retarder) : Borax by weight of cement.
[3]Selected as optimum quantity to yield a desired minimum thickening time of at least 300 minutes.

EXAMPLE 4

The following recitation of a typical production run of improved basic oil well cement illustrates implementation of our invention to intentionally use the stable forms of CaSO$_4$ by intergrinding a clinker which meets the API Class H moderate sulfate resistant-type chemical requirements and a blend of gypsum and insoluble anhydrite to provide a ratio of hemihydrate to anhydrite of about 30/70. Cement SO$_3$ is 2.5%. An improved basic oil well cement composition was prepared from 96.1 parts by weight of clinker, 1.4 parts by weight of natural gypsum including 0.6 parts by weight SO$_3$, and 2.5 parts by weight of natural anhydrite including 1.4 parts by weight SO$_3$.

The thickening times and consistencies of basic oil well cement formulations were mesured using the API Schedules and slurry compositions of Example 1. That is, to a typical API Class H hydraulic basic oil well cement, 38% water by weight of cement was added and the thickening time, consistency, free water and compressive strength of a neat slurry were measured in accordance with procedures described in the latest editions of and supplements to API RP 10B and specified in API Spec 10A. Another slurry was prepared with 0.3% CLS retarder using 38% water by weight of cement to determine compatibility. In this case, only free water, thickening times, and consistencies were measured in accordance with API schedule 5, 8000 ft well depth (125° F) and API Schedule 15, 6000 ft well depth (136° F BHCT). Basic oil well cement for these tests represents typical product from the same batch of a commercial run and samples were withdrawn from the same silo after 1 and 50 days storage.

The forms of the calcium sulfate contained in the basic oil well cement samples after each period of storage were measured by differential thermal analysis (DTA) in a commercial Deltatherm Model D2000 apparatus and confirmed by X-ray diffraction analysis (XRD).

The results of these tests are presented in Table VI.

It may be observed that added-$SO_3$ as gypsum of the gypsum/insoluble anhydrite blend was all converted and detected as hemihydrate in accordance with our invention during mill-controlled high temperature (about 250°–300° F) grinding and subsequent storage period of one day. No significant changes were noted in the cement added-$SO_3$ distribution after 50 days storage, indicating hitherto unattainable stability due to the stability of the calcium sulfate hemihydrate and insoluble anhydrite with respect to each other and with respect to time and temperature.

The results of physical tests in Table VI show that the cement not only conforms to the API Class H physical requirements with respect to storage in the silo for 50 days but — to those skilled in the art, the cement possesses about the same expected thickening time retarder response in 50 days as after one day in storage.

Prior to our invention, cement manufactured with all of the added-$SO_3$ as gypsum resulted in a product whose retarder compatibility performance changed during storage due to the continuing dehydration of the gypsum. These data are shown in Table VII.

TABLE VII
RELATIONSHIP OF STORAGE TO THICKENING TIME FOR BASIC OIL WELL CEMENT PRIOR TO INVENTION

Cement $SO_3^1$ - 2.5%

| Cement Silo | | | | | Pressurized Consistometer | | | Compressive Strength - psi | | DTA Analysis Cement Added-$SO_3$ Distribution - % | |
|---|---|---|---|---|---|---|---|---|---|---|---|
| Storage days | Temp. °F | API Sched. | BHCT °F | Additive % | Consistency $U_c$ 15–30 min | Thickening Time to 100 $U_c$ min | Free Water ml | 8 hours | | | |
| | | | | | | | | 1S-95F | 3S-140F | as Gyp | as Hemi. |
| 38% Water by Weight of Cement | | | | | | | | | | | |
| 1 | 180 | 5 | 125 | 0 | 19 | 119 | 3.5 | 500 | 1700 | 50 | 50 |
| 1 | 180 | 15 | 136 | 0.3 CLS | 14 | 176 | — | — | — | — | — |
| 36 | 150 | 5 | 125 | 0 | 15 | 133 | — | — | — | 25 | 75 |
| 36 | 150 | 15 | 136 | 0.3 CLS | 10 | 320 | — | — | — | — | — |
| 101 | 120 | 5 | 125 | 0 | 10 | 135 | — | — | — | 0 | 100 |
| 101 | 120 | 15 | 136 | 0.3 CLS | 25 | 133 | — | — | — | — | — |

[1] Typical Wagner Surface - 1300 to 1350 cm$^2$/g.
[2] Dash signifies test not run.

A series of tests similar to those shown in earlier examples is presented in Table VIII, in which simulations of 20,000 ft cementing conditions included temperatures of 500° F; relatively high concentrations of retarders were used.

TABLE VI
RELATIONSHIP OF STORAGE TO THICKENING TIME, FREE WATER AND COMPRESSIVE STRENGTH FOR IMPROVED BASIC OIL WELL CEMENT SUBSEQUENT TO INVENTION

Cement $SO_3^1$ - 2.5%

| Cement Silo | | | | Pressurized Consistometer | | | Compressive Strength - psi | | Cement Added-$SO_3$ Distribution - % | | |
|---|---|---|---|---|---|---|---|---|---|---|---|
| Storage days | Temp. °F | API Sched. | BHCT °F | Consistency $U_c$ 15–30 min | Thickening Time to 100 $U_c$ min | Free Water ml | 8 hours | | as Gyp. | as Hemi. | as Anhy. |
| | | | | | | | 1S-95F | 3S-140F | | | |
| 38% Water by Weight of Cement | | | | | | | | | | | |
| 1 | 180 | 5 Csg[2] | 125 | 12 | 118 | 3.3 | 350 | 1550 | 0 | 30 | 70 |
| 1 | 180 | 15 Sqz[3] | 136 | 13 | 205 | — | — | — | — | — | — |
| 50 | 140 | 5 Csg[2] | 125 | 9 | 118 | 2.5 | 360 | 1540 | 0 | 30 | 70 |
| 50 | 140 | 15 Csg[3] | 136 | 8 | 195 | — | — | — | — | — | — |

[1] Typical Wagner Surface - 1300 to 1325 cm$^2$/g.
[2] Neat Slurry - no additive.
[3] Basic Oil Well Cement + 0.3% CLS retarder by weight of cement.

TABLE VIII
ULTRA-HIGH TEMPERATURE THICKENING-TIME DATA FOR LABORATORY PREPARED BASIC OIL WELL CEMENT POST-BLENDED WITH HEMIHYDRATE AND ANHYDRITE.

Modified API Schedule 31 - 20000-ft Liner-Cementing Well Simulation Test[1]
Pressurized Consistometer

| $SO_3$ Blend Ratio Hemi./Anhy. | 1:1 CLS/Borax[2] % | Consistency - $U_c$ minutes | | | | | | Thickening Time minutes | | |
|---|---|---|---|---|---|---|---|---|---|---|
| | | 0 | 15 | 30 | 45 | 60 | 120 | 50 $U_c$ | 70 $U_c$ | 100 $U_c$ |
| | | 2.5% Cement $SO_3$ | | | | | | | | |
| 0/100 | 6.0 | 5 | 5 | 5 | 5 | 4 | 4 | 405+ | | |
| 0/100[3] | 6.0 | 1 | 3 | 3 | 1 | 4 | 1 | 360+ | | |
| 10/90 | 6.0 | 5 | 2 | 2 | 5 | 5 | 6 | 255 | 257 | 259 |
| 20/80 | 6.0 | 2 | 2 | 1 | 2 | 4 | 6 | 303 | 303 | 303 |
| 30/70 | 5.0 | 1 | 1 | 1 | 1 | 1 | 4 | 195 | 195 | 196 |
| 30/70 | 5.5 | (Test not run.) | | | | | | | | |
| 30/70 | 6.0[4] | 4 | 4 | 3 | 2 | 3 | 8 | 340 | 340 | 340 |
| 30/70 | 6.5 | (Test not run.) | | | | | | | | |
| 40/60 | 6.0 | 3 | 1 | 1 | 1 | 1 | 1 | 320 | 320 | 320 |
| 50/50 | 6.0 | 7 | 5 | 5 | 7 | 7 | 8 | 344 | 344 | 344 |
| 60/40 | 6.0 | 1 | 2 | 1 | 2 | 6 | 6 | 347 | 348 | 348 |
| 80/20 | 6.0 | 1 | 1 | 2 | 3 | 4 | 5 | 259 | 260 | 260 |
| 100/0 | 6.0 | 1 | 1 | 1 | 1 | 1 | | 226 | 227 | 231 |

[1]Test Condition: -
38% water by weight of cement
Bottom-hole circulating temperature 500 F
Bottom-hole pressure 16600 psi
Heating Rate 7.18 F/min
[2]1:1 CLS (calcium lignosulfonate retarder):Borax by weight of cement.
[3]Repeat test.
[4]Selected as optimum quantity to yield desired thickening time in the range of 300 to 360 minutes.

Thus it may be seen that our invention provides a hydraulic basic oil well cement and methods of making it. Our invention is not restricted to the particular examples and illustrations presented above. It may be otherwise variously practiced within the scope of the following claims.

We claim:

1. Hydraulic cement useful in oil well cementing comprising
    (a) cement clinker of a composition comprising from 45% to 68% tricalcium silicate ($C_3S$) and from 0 to 8% tricalcium aluminate ($C_3A$), and
    (b) from about 2.0 to about 4.0% sulfur trioxide ($SO_3$) by weight of cement, said sulfur trioxide present in calcium sulfate hemihydrate and insoluble calcium sulfate anhydrite in a ratio of from about 20:80 to 45:55.

2. Hydraulic cement of claim 1 having a Wagner specific surface area of from 1100 to 1800 cm²/g.

3. Hydraulic cement of claim 1 wherein the cement clinker content is about 91.5 to about 96.5 weight percent.

4. Hydraulic cement of claim 1 including, in addition, based on the weight of the ingredients of claim 1, up to 6.0% MgO, a loss on ignition of up to 3.5%, and up to 1.0% alkali metal oxide expressed as $Na_2O$ equivalent.

5. A cement slurry made from the cement of claim 1 and including about 38% to about 46% water based on the dry components of the composition of claim 1 and an amount of retarder sufficient to extend the thickening time of said slurry and to achieve a slurry viscosity not exceeding 30 units of consistency ($U_c$) in a 15 to 30 minute stirring period.

6. A cement slurry of claim 5 in which the retarder is a soluble salt of lignin sulfonic acid.

7. A cement slurry of claim 5 in which the retarder is a soluble salt of lignin sulfonic acid and in combination with a soluble salt of boric acid.

8. Method of making a hydraulic cement useful in oil well cementing comprising
    preparing a cement clinker of about 45–68% tricalcium silicate ($C_3S$) and up to about 8% tricalcium aluminate ($C_3A$),
    adding thereto calcium sulfate equivalent to about 2.0 to about 4.0% $SO_3$ by weight of cement, said calcium sulfate consisting essentially of calcium sulfate hemihydrate and insoluble calcium sulfate anhydrite in a ratio of from about 20:80 to 45:55, and
    grinding the components together.

9. Method of claim 8 in which the grinding together is performed at a temperature of about 200° F to about 750° F.

10. Method of making a hydraulic cement useful in oil well cement comprising
    (a) grinding a cement clinker of about 45–68% tricalcium silicate ($C_3S$) and up to about 8% tricalcium aluminate ($C_3A$), and
    (b) blending into the ground clinker calcium sulfate containing about 2.0 to about 4.0% $SO_3$ equivalent by weight of cement, said calcium sulfate consisting essentially of calcium sulfate hemihydrate and insoluble calcium sulfate anhydrite in a ratio of from about 20:80 to about 45:55.

* * * * *

UNITED STATES PATENT AND TRADEMARK OFFICE
CERTIFICATE OF CORRECTION

PATENT NO. : 4,098,613
DATED : July 4, 1978
INVENTOR(S) : Sam Maravilla and Stewart W. Tresouthick It is certified that error appears in the above-identified patent and that said Letters Patent are hereby corrected as shown below:

Column 12, Table VII, change the column Heading "DTA Analysis Cement Added-SO/g Distribution - %" to -- DTA Analysis Cement Added-$SO_3$ Distribution - % --.

Signed and Sealed this

Sixth Day of February 1979

[SEAL]

Attest:

RUTH C. MASON
Attesting Officer

DONALD W. BANNER
Commissioner of Patents and Trademarks